Jan. 27, 1925.                                                                1,524,481
P. KUTSCHERA
ANIMAL RELEASING DEVICE
Filed Feb. 8, 1921                                          2 Sheets-Sheet 2
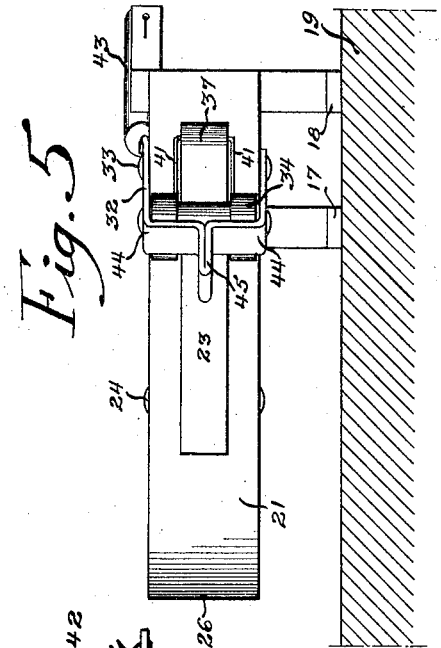
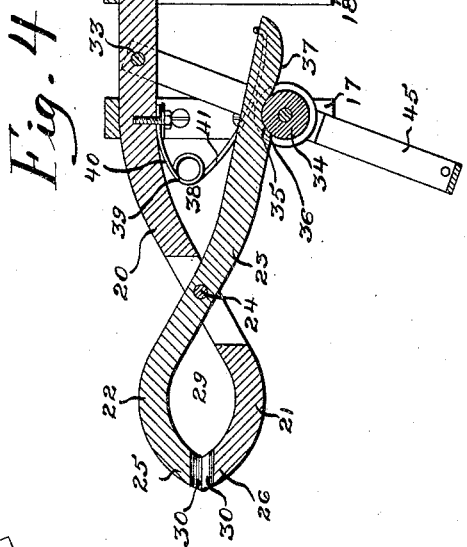
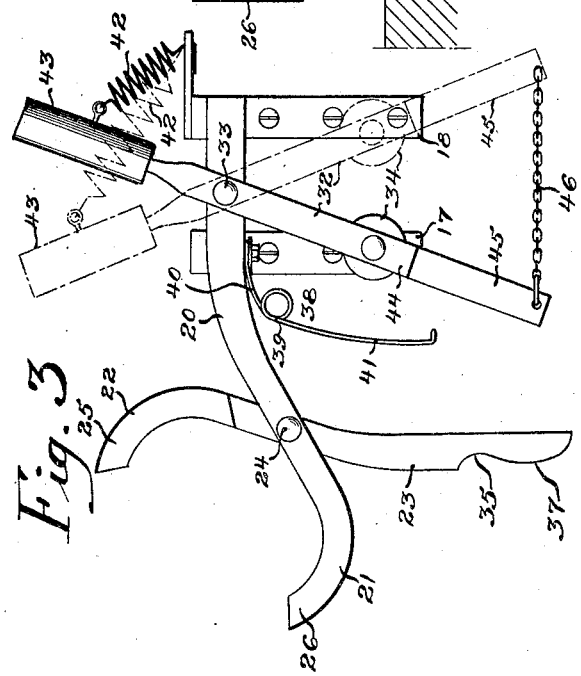
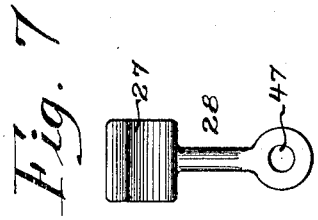
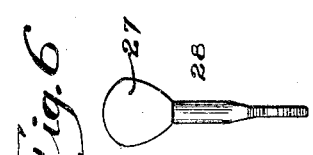
Witnesses,
Spencer W. Megonegal,
Augustus B. Coppes
Inventor
Peter Kutschera
by Joshua R. H. Potts
his Attorney.

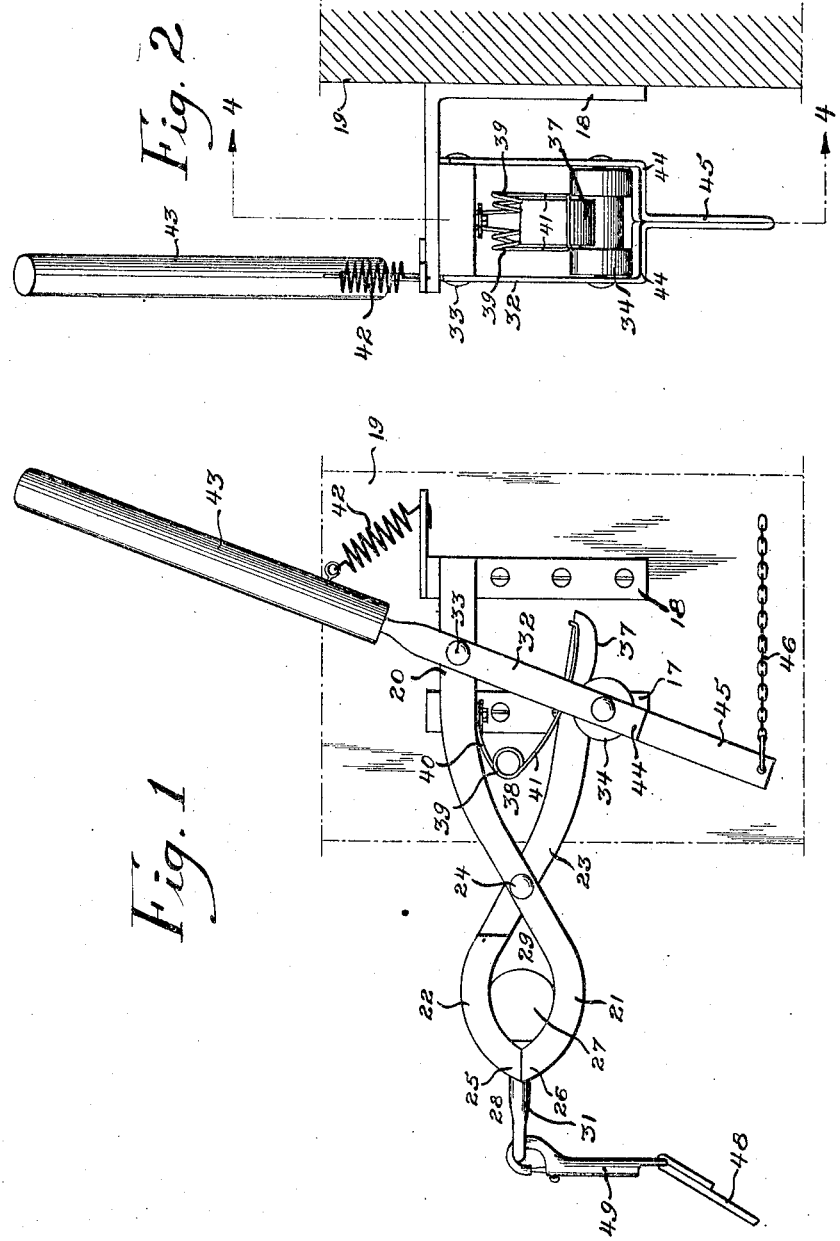

Patented Jan. 27, 1925.

1,524,481

UNITED STATES PATENT OFFICE.

PETER KUTSCHERA, OF PHILADELPHIA, PENNSYLVANIA.

ANIMAL-RELEASING DEVICE.

Application filed February 8, 1921. Serial No. 443,388.

*To all whom it may concern:*

Be it known that I, PETER KUTSCHERA, a citizen of the United States, residing at Philadelphia, in the county of Philadelphia and State of Pennsylvania, have invented certain new and useful Improvements in Animal-Releasing Devices, of which the following is a specification.

It is well known that during a fire in a stable that animals have often been burnt owing to the fact that it has been impossible to release the animals quickly enough to save them. Also during the fire the animals become frightened and pull on their halter lines so that it is practically impossible to release them with the ordinary means of attachment employed.

One object of my invention is to provide improved means which will serve to ordinarily retain the animals but which can be quickly actuated to effect their release in case of fire.

Another object is to make my invention in a strong and durable manner and so that it will be practical.

These objects, and other advantageous ends which will be described hereinafter, I attain in the following manner, reference being had to the accompanying drawings in which—

Figure 1 is a front elevation of a device made in accordance with my present invention, Figure 2 is a side view of Figure 1, Figure 3 is a view of similar character to Figure 1 showing the same after having been released and showing in dot-and-dash lines the position of the actuating lever into which it must be moved to effect the release, Figure 4 is a sectional elevation taken on the line 4—4 of Figure 2, Figure 5 is an inverted plan view of Figure 1, Figure 6 is a face view of a coupling member which forms a part of my invention, and Figure 7 is a side view of Figure 6.

Referring to the drawings, 17 and 18 represent two brackets which may be screwed or otherwise secured to a supporting wall or upright structure 19. The horizontal legs of these two brackets support a member 20 which projects forwardly of the brackets and has a front curved portion 21 as shown in Figure 1.

A jaw 22, which is shaped similarly to the portion 21 of the member 20, has an extension 23 which is pivoted at 24 to the member 20 to the rear of the portion 21. The jaw 22 curves upwardly and has an end 25 which co-acts with an end 26 of the portion 21; said portion 21 also forming a jaw to retain the ball or enlarged end 27 of a coupling member 28. When the jaws 21 and 22 are in their closed position as shown in Figure 1 there is a space 29 between them in which the end 27 of the coupling member 28 fits; said ends 25 and 26 of the jaws being notched in the direction of the length of the jaws as shown at 30; the notches registering and permitting the shank 31 of the coupling member to extend forwardly therefrom. A lever 32 is pivoted at 33 to the side of the member 20 and said lever has an anti-friction roller 34 as shown in Figure 4 which engages a recess or notch 35 in the lower surface of the extension 23 of the jaw 22. This recess is made preferably to correspond with the curvature of the peripheral surface of the roller 34 and so as to provide a shoulder 36. From the shoulder 36 the recess leads to a convex portion 37 of the under surface of the extension 23 so that the inner surface of the recess and the portion 37 of the surface of the extension forms a compound or ogee curve. A spring 38 has a coil portion 39 and two leads 40 and 41; the lead 40 being secured to the member 20 while the lead 41 normally presses against the upper surface of the extension 23 of the jaw 22 and serves to hold the recessed portion of the extension in engagement with the roller 34 as clearly shown in Figures 1, 2 and 4; the lever in its normal position extending at an incline so that the roller 34 is at one side of a plane passing axially through the pivot 33. A coil spring 42 serves to hold the lever in this position.

The top of the lever 32 has a handle 43 thereon and the lower yoked portion 44 of the lever which forms a mounting for the roller 34 has a depending part 45 to which may be connected a chain 46 or other flexible device which is not readily inflammable. The coupling member 28 has an eye 47 to which can be attached the securing line 48 such for example as the halter line used to secure a horse or other animal within a stall; the means of connection between said halter line and the coupling member being preferably in the form of a snap hook 49 so that when desired to release the animal under ordinary conditions it is merely necessary to detach the hook 49 from the eye 47 without changing the position of the other parts of the releasing means as is obvious from the construction shown. Or if desired the eye 47 can be made sufficiently large to permit a number of halter lines to be attached thereto in case one of the devices is used for securing a number of animals.

When it is desired to operate the device to release an animal or a number of animals connected therewith it is merely necessary to swing the lever 43 from the position shown in full lines in Figure 1 into the position shown in dot-and-dash lines in Figure 3. This action will cause the roller to be forced out of the recess 35 over the convex surface portion 37 so as to free the end of the extension 23. This will release the extension 23 and jaw 22, and the coupling member 28 will then be free to pull out of its connection with the remaining portion of the device so that the animal or animals will be released; the extension 23 being heavier than the jaw 22 and also movable by the lead 41 of the spring 38 will be automatically moved into the position shown in Figure 3 and remain in said position until the device is re-set in case the device is not destroyed by the fire.

Considering that it is impossible for a person to reach and operate the handle 43, the chain or flexible device 46 can be extended for example outside of the building and can be pulled so as to operate the lever to release the coupling member 28 from the jaws 21 and 22.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claim.

Having thus described my invention, what I claim as new and desire to secure by Letters Patent is:—

A device of the character described including supporting brackets, a jaw fixedly carried by the brackets and provided with a notched out portion formed in its clamping end and extending in the direction of the length of the jaw, a jaw pivotally carried by the fixed jaw and having a notched out portion formed in its clamping end and extending in the direction of the length of the pivotally carried jaw adapted for registration with the notched out portion of the fixed jaw and having a notched out portion formed in its end opposite the clamping end thereof, in combination with a coupling member having a portion adapted to be confined within the notched out portions when the jaws are moved into clamping relation and having an enlarged ball-like portion adapted to be disposed to the rear of the notched out portions of the jaws when the coupling member is secured therebetween, and a lever pivotally carried by the fixed jaw and having a portion for engagement with the notched out portion for holding the pivotally carried jaw into clamping relation with the fixed jaw.

In testimony whereof I have signed my name to this specification in the presence of two subscribing witnesses.

PETER KUTSCHERA.

Witnesses:
  CHAS. E. POTTS,
  ELIZABETH GARBE.